United States Patent [19]
Krause et al.

[11] Patent Number: 5,949,948
[45] Date of Patent: *Sep. 7, 1999

[54] METHOD AND APPARATUS FOR IMPLEMENTING PLAYBACK FEATURES FOR COMPRESSED VIDEO DATA

[75] Inventors: Edward A. Krause, El Cerrito; Paul Shen; Adam S. Tom, both of San Francisco, all of Calif.

[73] Assignee: Imedia Corporation, San Francisco, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/560,732

[22] Filed: Nov. 20, 1995

[51] Int. Cl.$^6$ ....................................................... H04N 5/76
[52] U.S. Cl. ................................. 386/6; 68/110; 68/125
[58] Field of Search ...................... 358/335, 312; 360/10.1, 10.3; 386/5, 6, 68, 110, 107, 125; H04N 5/92, 5/78, 5/76

[56] References Cited

U.S. PATENT DOCUMENTS

| | | | |
|---|---|---|---|
| 5,168,353 | 12/1992 | Walker et al. | 358/86 |
| 5,267,334 | 11/1993 | Normille et al. | 382/56 |
| 5,282,049 | 1/1994 | Hatakenaka et al. | 358/335 |
| 5,305,113 | 4/1994 | Iwamura et al. | 358/312 |
| 5,371,551 | 12/1994 | Logan et al. | 348/571 |
| 5,377,051 | 12/1994 | Lane et al. | 360/33.1 |
| 5,390,027 | 2/1995 | Henmi et al. | 360/10.3 |
| 5,398,143 | 3/1995 | Strolle et al. | 360/48 |
| 5,438,423 | 8/1995 | Lynch et al. | 358/335 |
| 5,442,390 | 8/1995 | Hooper et al. | 348/7 |
| 5,526,131 | 6/1996 | Strolle et al. | 358/335 |
| 5,535,008 | 7/1996 | Yamagishi et al. | 358/342 |
| 5,568,274 | 10/1996 | Fujinami et al. | 386/107 |

FOREIGN PATENT DOCUMENTS

| | | | |
|---|---|---|---|
| 0 396 285 A2 | 11/1990 | European Pat. Off. | H04N 5/92 |
| 0473416 | 3/1992 | European Pat. Off. | H04N 5/78 |
| 0620683 | 10/1994 | European Pat. Off. | H04N 5/92 |
| 0637888 | 2/1995 | European Pat. Off. | H04N 5/92 |
| 0 674 448 A2 | 9/1995 | European Pat. Off. | H04N 7/52 |
| 406133268 | 5/1994 | Japan | H04N 5/92 |
| 406276485 | 9/1994 | Japan | H04N 5/92 |

OTHER PUBLICATIONS

Aravind, Rangarajan et al., Image and Video Coding Standards, *AT&T Technical Journal*, Jan./Feb. 1993, pp. 67–91.

*Primary Examiner*—Brian L. Casler
*Assistant Examiner*—Luanne P. Din
*Attorney, Agent, or Firm*—McCutchen, Doyle, Brown & Enersen,LLP

[57] ABSTRACT

A compressed video playback system which eliminates playback mode transition artifacts. Transitions between various playback modes are effected in such a manner that transition artifacts are eliminated by delaying playback mode transitions until appropriate frames of data are detected for propagation to the compressed video decoder. In addition, compressed video data retrieval methods are improved for supporting multi-speed playback modes in both forward and reverse directions in an optimal manner.

28 Claims, 5 Drawing Sheets

METHOD AND APPARATUS FOR IMPLEMENTING PLAYBACK FEATURES FOR COMPRESSED VIDEO DATA

BACKGROUND OF THE INVENTION

1. Field of the Invention

The present invention relates to the field of storage and transmission of compressed video information. More particularly, the present invention relates to providing playback features such as fast forward and reverse playback during decompression of encoded video programs.

2. Background

Applications involving video transmission or storage require some form of data compression to reduce the otherwise tremendous volume of information required for video data. The International Organization for Standardization (ISO) Motion Picture Experts Group (MPEG) has developed a standard for compressing video data to manageable or useful volumes while still preserving enough "information" to be useful for various storage or transmission applications. These applications for storage or transmission on various digital media include compact disc, remote video data bases, movies on demand, digital cable television, and high definition television. MPEG is documented in ISO/IEC publications 11172 ("Coding of Moving Pictures and Associated Audio for Digital Storage Media") and 13818 ("Generalized Coding of Motion Pictures and Associated Audio Information"), also known as MPEG-1 and MPEG-2, respectively. As used hereafter, "MPEG" will be understood to refer to either MPEG-1 or MPEG-2 without distinction therebetween.

The MPEG standard recognizes that much of the information in a picture within a video sequence is similar to information in a previous or subsequent picture. The MPEG standard takes advantage of this temporal redundancy to represent some pictures in terms of their differences from one or more pictures. A picture consists of a number of horizontal slices; a slice consists of a number of macroblocks; a macroblock consists of an array of blocks; and a block consists of a 8×8 array of pixels.

The video part of the MPEG standard uses motion compensated predictive coding, the discrete cosine transform (DCT), adaptive quantization, variable-length encoding, and run-length encoding to compress images on a block-by-block basis. Motion compensation replaces a macroblock with a motion vector representing its gross displacement from a corresponding macroblock in the reference picture, plus error terms for each of the pixels in the macroblock. MPEG uses both forward motion compensation (in which a future picture referenced to a past picture), and a combination of forward and backward motion compensation (in which a picture is referenced to a past picture). The combined forward and backward motion compensation is called bi-directional motion compensation.

According to the MPEG standard, video frames (pictures) are classified into one of three types: I-frames, also called I-pictures or intraframe coded pictures; predicted pictures, also called P-frames or P-pictures; and B-frames or B-pictures, also called bi-directionally coded pictures. P-frames and B-frames are also collectively referred to as interframe coded images. The three types of video frames differ in their use of motion compensation.

Intra pictures (I-frames or I-pictures) are coded using only information present in the picture itself. They can be thought of as being independent pictures. I-pictures provide random access points into the compressed video data. I-pictures use only transform coding and therefore provide only moderate compression. An I-frame provides enough information for a complete picture to be generated from the I-frame alone.

Predicted pictures (P-pictures or P-frames) are coded from a previous I-picture or previous P-picture as a reference. They can be thought of as dependent pictures. The compression of P-pictures uses motion-compensated temporal prediction of some or all macroblocks in the P-picture relative to corresponding macroblocks from the previous I- or P-picture. Only forward motion estimation/compensation is used in this temporal prediction. The I- or P-picture from which a P-picture is temporally predicted is called the anchor picture to the P-picture and is sometimes referred to as the reference picture or reference frame. Predicted pictures provide more compression than I-pictures because only the difference from a previous picture is encoded. One drawback of using P-pictures as anchors for subsequent P-pictures is that coding errors may be propagated through the subsequent prediction of P-pictures.

Bi-directional pictures (B-pictures or B-frames) are pictures that use both a past and future pictures as references. Like P-pictures they can be thought of as dependent pictures. Some or all macroblocks in B-pictures are coded by a bi-directional motion-compensated predictive encoder using corresponding macroblocks from a "future" I- or P-picture for backwards prediction and from a previous I- or P-picture for forward prediction. The two reference I- or P-pictures from which a B-picture is temporally predicted are thus called the anchor pictures of the B-picture. Like P-pictures, B-pictures only encode the temporal differences between the B-picture and its two anchor pictures. Bi-directional pictures provide the most compression and do not propagate errors because they are never used as a reference. Bi-directional prediction also decreases the effects of noise by averaging two pictures.

In accordance with the MPEG standard, pictures are arranged in ordered groups. The MPEG standard allows the encoder to choose the frequency and location of I-pictures. As an example, a single group might include an I-picture as the first picture in the group with P-pictures distributed following every third picture and B-pictures between each "I and P" and "P and P" sequence. A typical display order of picture types might include an I-picture every fifteenth frame, each I-picture followed by two B-pictures with P-pictures between each group of B-pictures in a sequence something like I B B P B B P B B P B B P B B I. Including an I-picture every fifteenth frame corresponds to (in a frame per second environment), having a complete picture representation (an independent picture) every one half-second.

In some MPEG systems, the MPEG encoder will reorder the pictures in the video stream to present the pictures to the decoder in the most efficient sequence. In particular, the reference pictures needed to reconstruct B-pictures may be sent before the associated B-pictures.

A number of well-known references, e.g. Mattison, "Practical Digital Video", Wiley, 1994 may be referenced for details about various actual mechanisms for encoding the video data in accordance with the MPEG standard. For purposes of the present application, it is important to understand the distinction between I-, P- and B- pictures. Specifically, it is important to recognize that only I-pictures (independent or reference pictures) provide enough information to reconstruct a complete picture in a video sequence without reference to other pictures.

Existing MPEG decoders are concerned with the reconstruction and display of encoded video information. However, for users viewing the decoded information, it is often desirable to view the information in a mode other than normal speed forward playback. Such alternative modes include being able to pause, or freeze, a current image that is being displayed. Likewise, it is often desirable to provide a slow motion playback in both the forward and reverse directions as well as fast forward and high-speed reverse functionality.

To implement a pause function, MPEG decoders generally provide some mechanism for freezing the current image that is being displayed, thereby temporarily halting the decompression process. Decoders also generally include an input buffer in order to provide a certain level of decoupling between the timing of the decoding process and the timing of the data delivery system which would typically consist of a storage device and a storage controller. Therefore, when the decoding process is halted, the amount of data that is stored in the buffer begins to increase. In some implementations, a feedback mechanism responsive to the depth level of the input buffer is provided to the storage controller, causing it to halt the data transfer whenever necessary to prevent the buffer from overflowing.

Like the pause function, slow motion playback in the forward direction can be achieved simply by sending one or more instructions to the decoder. These instructions cause the decoder to repeat each or some frames one or more times. As before, the amount of data accumulating in the decoder's input buffer will increase during slow motion playback due to the reduced output rate. This can be compensated for by a feedback mechanism similar to the one described above.

In order to implement the fast forward function, some frames must be discarded, either by the decoder or the preceding data delivery system. This is because the output display rate is generally limited by the decoding and/or display apparatus (e.g., 30 frames per second on a standard television video display). An increase in the rate of playback can be realized by deleting the B-frames, should any exist. For example, if two of every three frames is a B-frame, then eliminating B-frames results in a three-fold increase in the rate of playback. Alternatively, the playback rate can be increased by fifty percent by first deleting all of the B-frames and then instructing the decoder to repeat each remaining frame one time. Since the B-frames are not needed for reconstruction of the remaining I- and P-frames, their deletion would not compromise the accuracy of the remaining images. Higher playback rates can be achieved by deleting not only the B-frames, but the P-frames as well. This would leave only the I-frames which can always be reconstructed without referencing any other images. For example, if every fifteenth frame is an I-frame, then the rate of playback could be increased by a factor of fifteen simply by deleting all other frames. In practice, such an increase may be realized only if the data delivery system is capable of retrieving and presenting the data to the decoder fifteen times faster than the rate required for normal playback. Otherwise, if the data delivery hardware is not fast enough, the decoder's input buffer may underflow, forcing the decoder to freeze a current image until more data becomes available.

The demands placed on the data delivery hardware can be even more severe during reverse playback. In a practical implementation of reverse playback, only the I-frames are useful. This is because the P- and B-frames cannot be reconstructed without using previously decoded frames for prediction. Unfortunately, the previous frames referred to during forward playback become future frames during reverse playback. Theoretically, these prerequisite frames could be reconstructed in advance and then stored in memory, but this would significantly increase the cost of the playback system. Therefore, a preferred solution is to retrieve and display only the I-frames. Various playback rates can still be achieved by repeating these I-frames one or more times. A more difficult problem, however, is to attain high reverse playback rates without having to repeat each frame a multiple number of times while waiting for additional data to become available. Such multiple repetitions can seriously degrade motion rendition.

One of the difficulties associated with multi-speed playback of compressed bit streams is the problem of transitioning from one playback mode to another. For example, during forward playback at high speed or reverse playback at any speed, generally, only the I-frames are selected by the storage controller and provided to the display system's decoder. When transitioning from one of the modes to forward playback at normal speed, the sequence in which frames are selected by the controller and presented to the decoder is altered. In this particular case, the controller would stop deleting P-frames and B-frames from the compressed bit stream and instead would pass all types of frames to the decoder. Such a transition may cause artifacts to appear and remain visible during the entire transition. For example, if the first frame encountered after the controller begins to accept all types of frames is a P-frame, then the decoder must reference a preceding I- or P-frame when forming the prediction required for reconstruction. However, the decoder would only be able to access the last I-frame that was received prior to the transition to normal playback, and if this is not identical to the preceding frame that was used during the original encoding process, then an artifact will occur. Similarly, if the first frame encountered after the transition is a B-frame then artifacts are almost certain to occur since two prerequisite frames would be required to form the prediction, and at least one of these prerequisite frames is likely to be a P-frame, assuming typical encoding parameters.

From the foregoing it can be appreciated that it is desirable, and is therefore an object of the present invention, to prevent transition artifacts when changing playback modes in a multi-speed playback compressed video system. Further, it would be desirable to have a mechanism for efficient data access to support multi-speed playback in a compressed video system.

SUMMARY OF THE INVENTION

From the foregoing, it can be appreciated and it is desirable, and therefore an object of the present invention, to provide a method and apparatus for eliminating transition artifacts in the playback of compressed video information when transitioning from one playback mode to another. It is another object of the present invention to provide mechanisms for efficiently retrieving from a storage device compressed video information in accordance with a desired playback mode.

These and other objects of the present invention are provided in a video playback system in which a storage controller controls the flow of compressed video data to a video decoder in a manner to eliminate transition artifacts when transitioning from one playback mode to another. The storage controller, in response to a playback mode transition instruction, delays altering the mode of data propagation to the video decoder in accordance with an optimal propagation approach for the transition mode. In accordance with one embodiment of the present invention where the compressed video data are encoded in accordance with the MPEG standard, the storage controller will delay switching to the requested playback mode until the transition is completed. Upon entry into a transition interval, all retrieved data frames will be discarded until the occurrence of the next I-frame. This eliminates the possibility of interframe images being supplied to the decoder for which no reference frame is available for accurate frame depiction. Subsequently, the controller continues to discard B-frames until receipt of the first P-frame. In some implementations it may be desirable to instruct the decoder to flush or empty its associated buffer upon entering a transition interval. However, since this will not shorten the duration of the interval, a more pleasing effect may be achieved by allowing the decoder to continue decoding and displaying images as long as its buffer does not become empty. In this way the halting of the decoding and display processes may be delayed and in some cases prevented depending on the duration of the transition interval.

In accordance with another aspect of the present invention, a mechanism is implemented for supporting various playback modes where it is desirable to efficiently seek I-frames as they are stored in a storage device. In this aspect of the present invention, it is recognized that I-frames will occur with a reasonable amount of predictability throughout the storage device and thus, memory retrievals may be made to blocks of memory that reasonably estimate the location of the I-frames. The optimally selected blocks of memory then retrieved may be quickly scanned for the presence of the desired I-frame to support both forward and reverse playback at varying rates of speed.

In an alternative embodiment of the present invention, a mechanism is introduced for tabling the memory location of each I-frame in a compressed video program. As the compressed program is received by a storage device, an I-frame detector notes the arrival of each I-frame and provides this information to a host system which may control the maintenance of a table which corresponds I-frames to particular blocks of memory in the storage device. In this way, efficient and rapid retrieval of I-frame data blocks may be provided by the storage controller for providing appropriate blocks of memory to the decoder for effecting various playback modes.

BRIEF DESCRIPTION OF THE DRAWINGS

The objects, features and advantages of the present invention will be apparent from the following detailed description, in which.

DETAILED DESCRIPTION OF THE INVENTION

A method and apparatus are disclosed for use in a compressed video playback system wherein multi-speed playback modes are envisioned. These multi-speed playback modes include both varying speed forward playback as well as varying speed reverse playback. Although the present invention is described predominantly in terms of the transmission and storage of video information encoded in accordance with the MPEG format, the concepts and methods are broad enough to encompass video playback systems using other video compression techniques. Throughout this detailed description, numerous details are specified such as frame types and sequence organizations, in order to provide a thorough understanding of the present invention. To one skilled in the art, however, it will be understood that the present invention may be practiced without such specific details. In other instances, well-known control structures and encoder/decoder circuits have not been shown in detail in order not to obscure the present invention. Particularly, many functions are described to be carried out by various components within a compressed video playback system. Those of ordinary skill in the art, once the functionality to be carried out by such circuits is described, will be able to implement the necessary components without undue experimentation.

Figure 1:
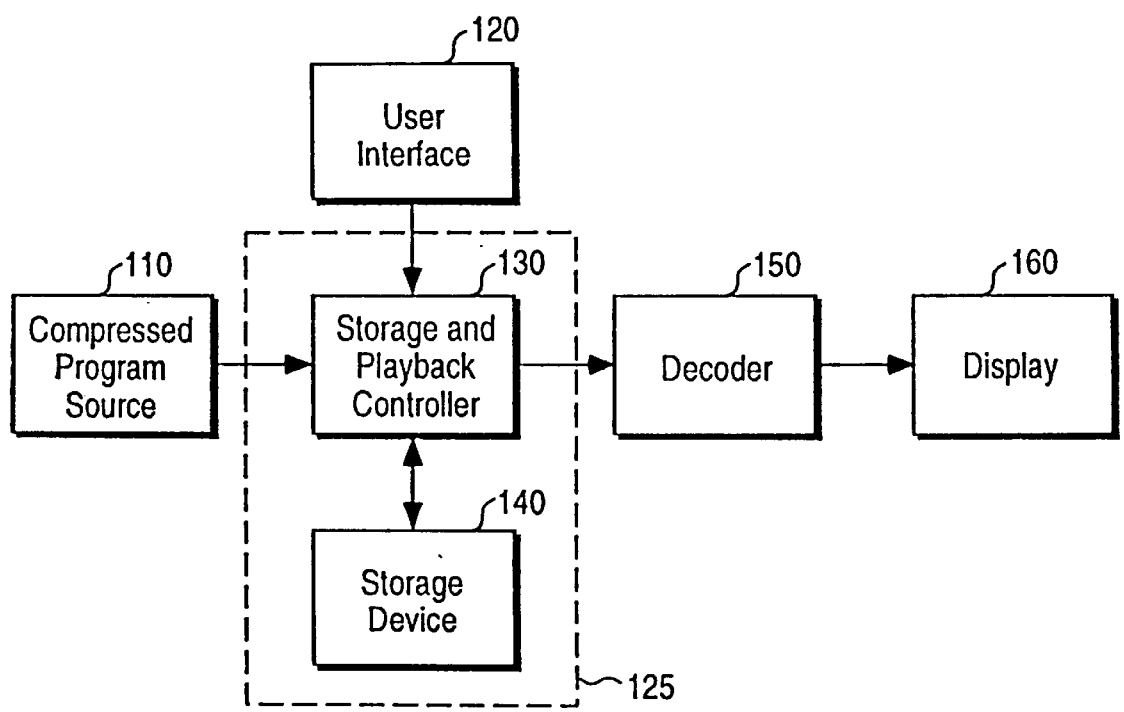
FIG. 1 illustrates a block diagram of a compressed video display system which may incorporate the teachings of the present invention.

Referring now to FIG. 1, there is shown a generalized hardware diagram suitable for practicing the present invention. A Storage System 125 includes a Playback/Storage Controller 130 and a Storage Device 140. In an exemplary embodiment, Controller 130 receives data from a Compressed Program Source 110, which may be an encoder, a cable or satellite receiver, a host processor, or any other source of encoded video data. In one embodiment of the present invention, the compressed video data are encoded in accordance with the MPEG standard described above and includes data about I-, P-, and B-pictures comprising the video information. The compressed program data are typically written to a Storage Device 140 under the control of Controller 130. Alternatively, the Compressed Program Source 110 may deliver the data directly to the Storage Device 140. Storage Device 140 may comprise one or more hard disks that stores the entire data stream for delayed decoding, a computer memory which buffers a moving window of the data stream needed for on-the-fly decoding, or any other storage device.

During playback, the compressed program data are retrieved from Storage Device 140 and delivered under the direction of Controller 130 to Decoder 150 where the data are decompressed and subsequently displayed on a display device 160. This playback process is performed in accordance with playback mode commands sent from User Interface 120 to Controller 130. Such playback modes might include normal playback, fast forward and reverse playback, slow forward and reverse playback, and pause. The User Interface 120 may be incorporated into a set-top box or other control mechanism suitable for directing playback of a video program.

The compressed video data stream retrieved from Storage Device 140 generally must be edited before the data are presented to the Decoder 150, especially when the playback command is different from normal playback. This data manipulation functionality is provided by Controller 130. As will be described below, the compressed data manipulation process is dependent on the particular playback mode that has been selected and involves the extraction of certain I-, P-, or B-frames from the sometimes discontinuous data stream that is recovered from Storage Device 140. It is possible that some of these editing capabilities may come to be implemented commercially in certain decoders, and if this is the case, then the Controller 130 may be simplified accordingly.

It should also be mentioned that MPEG compressed data streams consist of a hierarchy of header and extension layers in addition to the actual I-, P-, and B-frame data. During the following discussion, it will be assumed that all such header and extension layer information is combined with the image frame that immediately follows. For example, if an I-frame is encountered and it is preceded by a sequence header, sequence extension header, group-of-pictures header, and picture header, then all of this information would be considered as part of the I-frame itself, and the beginning of the first such header would be treated as the beginning of the frame.

One of the difficulties associated with multi-speed playback of compressed bit streams is the problem of transitioning from one mode to another. For example, during forward playback at high speed or reverse playback at any speed, generally only the I-frames are selected by the Controller 130 and provided to the decoder (as will be discussed with respect to Table I below). When transitioning from one of these modes to normal playback, the sequence in which frames are selected by the Controller 130 and presented to the decoder, is altered. In this particular case, the Controller 130 will stop discarding P-frames and B-frames from the compressed bit stream and instead will pass all types of frames to the Decoder 150. Usually, such a transition will cause transition artifacts to appear and remain visible during the entire transition period. For instance, if the first frame encountered after the Controller 130 begins to accept all types of frames is a P-frame, then the decoder must reference a preceding I- or P-frame when forming the prediction required for reconstruction of this frame. However, the Decoder 150 is only able to reference the last I-frame that was received prior to the transition to normal playback, and if this is not the reference frame used during the encoding process, then an artifact will occur. Alternatively, if the first frame encountered after the transition is a B-frame, then artifacts will most certainly occur since two prerequisite frames are required to form the prediction, and at least one of these prerequisite frames is a P-frame, assuming typical encoding parameters.

A method for preventing such transition artifacts is described with reference to FIG. 2. Upon receiving a command to transition to a different playback mode, the Controller 130 determines the types of frames that are needed for the specified playback mode according to Table I below:

TABLE I

| PLAYBACK MODE | I_ENABLE | P_ENABLE | B_ENABLE |
|---|---|---|---|
| NORMAL PLAYBACK | 1 | 1 | 1 |
| SLOW MOTION FORWARD | 1 | 1 | 1 |
| MEDIUM FORWARD | 1 | 1 | 0 |
| FAST FORWARD | 1 | 0 | 0 |
| SLOW REVERSE | 1 | 0 | 0 |
| MEDIUM REVERSE | 1 | 0 | 0 |
| FAST REVERSE | 1 | 0 | 0 |

For example, normal playback or slow motion forward playback requires I-, P- and B-frames, medium forward requires only I- and P-frames, and fast forward or any reverse speed requires only I-frames. The required frame types for a given playback mode are indicated by setting I_ENABLE, B_ENABLE and P_ENABLE to 1 or 0, depending on whether I-frames, P-frames, and B-frames are to be allowed or disallowed respectively during the particular mode of playback subsequent to the transition.

Figure 2:
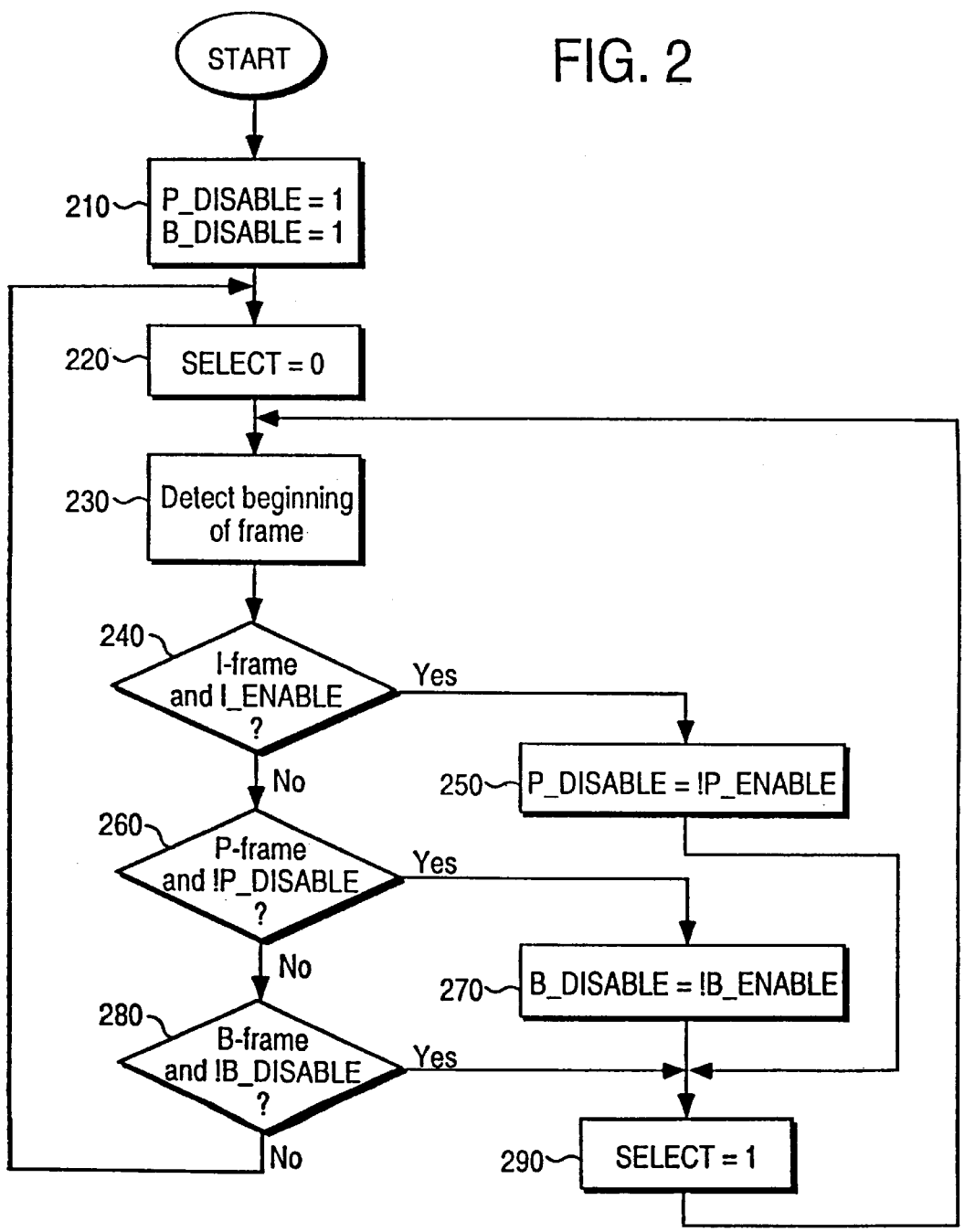
FIG. 2 illustrates a flow diagram for use by a compressed video display system for eliminating transition artifacts when transitioning between various playback modes.

Once the required frame types are specified, the Controller 130 implements the process shown in FIG. 2 in accordance with the specified frame types. In step 210, frame-forwarding variables P_DISABLE and B_DISABLE are set to 1 in order to temporarily disable the selection of P- and B-frames that would cause artifacts absent the prerequisite frames. Such disablement is required for most playback transitions; however, those skilled in the art will appreciate that for certain transitions, temporary disablement need not occur. For example, in transitioning from medium forward playback (I- and P-frames) to normal playback (I-, P- and B-frames), it would not be necessary to disable either P- or B-frames prior to the first I-frame after the transition command. For the majority of transitions, in which disablement is implemented, a variable called SELECT is set to 0 in step 220 to indicate that any subsequent data are also to be discarded rather than passed on to the decoder. SELECT will remain unchanged until the beginning of the first I-frame is detected at step 240. When this occurs, SELECT will be set to 1, in step 290, so that the I-frame data will be selected and provided to the decoder. Once the first I-frame has been detected and forwarded to the Decoder 150, subsequent P-frames can be forwarded to the Decoder 150 without danger of transition artifacts due to a missing prerequisite I- or P-frame. P_DISABLE is then turned off to allow subsequent selection of P-frames if P-frames are required for the specified playback mode. Thus, in step 250, if P-frames are required (P_ENABLE=1), then P_DISABLE is set to 0, but if P-frames are not required (P_ENABLE=0), then P_DISABLE remains set at 1.

Steps 260 and 270 illustrate a process for enabling the selection of B-frames analogous to that for enabling the selection of P-frames in steps 240 and 250. That is, once the first P-frame has been selected (P_DISABLE=0 in step 260), B-frame selection can be enabled if B-frames are required (B_ENABLE=1 in step 270) and any required B-frames can be sent to the Decoder 150 in step 280 without danger of transition artifacts due to a missing prerequisite P- or I-frame. Of course, if P-frames are not required (P_DISABLE=1), B-frame selection will never be enabled (step 270 is skipped and B_DISABLE remains at 1 as initialized in step 210), and B-frames will always be discarded (condition 'n') at step 280.

At this point, the transition process is completed and a steady state process begins. This method of frame selection during transitions will insure that the Decoder 150 will only receive frames that can be properly decoded during the entire transition period. Of course, any subsequent transition, either prior to or after completion of the present transition, would restart the process in its entirety. For example, whenever a new playback mode is specified, a reset signal could be sent to the Controller 130 to jump to step 210 of FIG. 2. The method can also be used when accessing a compressed bit stream for the first time or when randomly accessing one or more bit streams at any point thereafter.

Those skilled in the art will readily appreciate that the exemplary process illustrated in FIG. 2 can easily be extended to any desired frame selection criteria. For example, instead of conditioning selection of P-frames on preceding I-frames and selection of B-frames on preceding P-frames, one could condition selection of n-th I-frames on preceding I-frames and selection of P-frames on the preceding n-th I-frames. In general, frames may be hierarchically characterized as a multitude of frame types according to any definable characteristic, and selection of frames of any particular type can be conditioned on previous selection of one or more frames of different types. Thus, the generalized process is not limited to transitioning between different playback speeds, but is generally useful for any transition that can be characterized in terms of changes to identifiable frame types.

During normal playback, the steady state operation of Controller 130 and Storage Device 140 is usually quite simple. All of the compressed program data are retrieved from Storage Device 140 in sequential order and then provided to Decoder 150. However, during high speed forward playback, Storage Device 140 or Controller 130 may not be capable of delivering all of the data at the desired rate. Therefore at certain playback speeds, it may be necessary to sample the compressed data by retrieving certain storage blocks from Storage Device 140 and skipping over others. In fact, the compressed data must always be sampled at certain intervals during reverse playback since sequential access can no longer be applied. Ideally, the storage blocks which are retrieved would correspond to the frames which are to be displayed and the storage blocks which are skipped would correspond to the frames which are to be discarded. However, in practice, an exact correspondence is difficult to achieve. Storage devices are typically sub-divided into fixed-size storage blocks and any transfer of information must be rounded upwards to the nearest integral number of storage blocks. Frames, on the other hand, are variable in size with I-frames typically containing more data than P-frames and P-frames typically containing more data than B-frames. These frames need not begin at storage block boundaries and it would be inefficient to force such a constraint. Moreover, the size of these frames would not be known at the time they are to be retrieved unless additional steps are taken to calculate and store these values in advance. The preferred solution is to transfer at least a fixed minimum number of storage blocks to the Controller each time data are to be retrieved. For simplicity, this fixed minimum amount of data corresponding to an arbitrary number of storage blocks, will be referred to as a single storage block.

Two exemplary embodiments of processes for non-sequentially accessing the storage device will be described with respect to FIGS. 3 and 4, respectively. In these embodiments, it will be assumed that data are stored on the storage device in contiguous and sequential format without using a file system. However, the methods apply as well to storage devices in which file systems (e.g., look-up tables or other well-known techniques) are used to associate sequential storage block addresses with non-sequential physical addresses on the storage device. In such cases, the storage block addresses can be derived using the same methods that will be described, and then mapped to the corresponding physical addresses on the storage device by applying the parameters of the file system.

It will further be assumed that only the I-frames are to be selected (corresponding to fast forward or reverse playback modes in Table I), since non-sequential access can usually be avoided if this is not the case (normal playback, slow motion forward, and medium motion forward playback modes in Table I). In the first embodiment, the location of these I-frames on the storage device is assumed to be unknown. In the second embodiment, the storage block address corresponding to the beginning of each I-frame is assumed to be known during playback and a mechanism for generating this information will also be described.

Non-Sequential Access Without Previously Known Address Information

Figure 3:
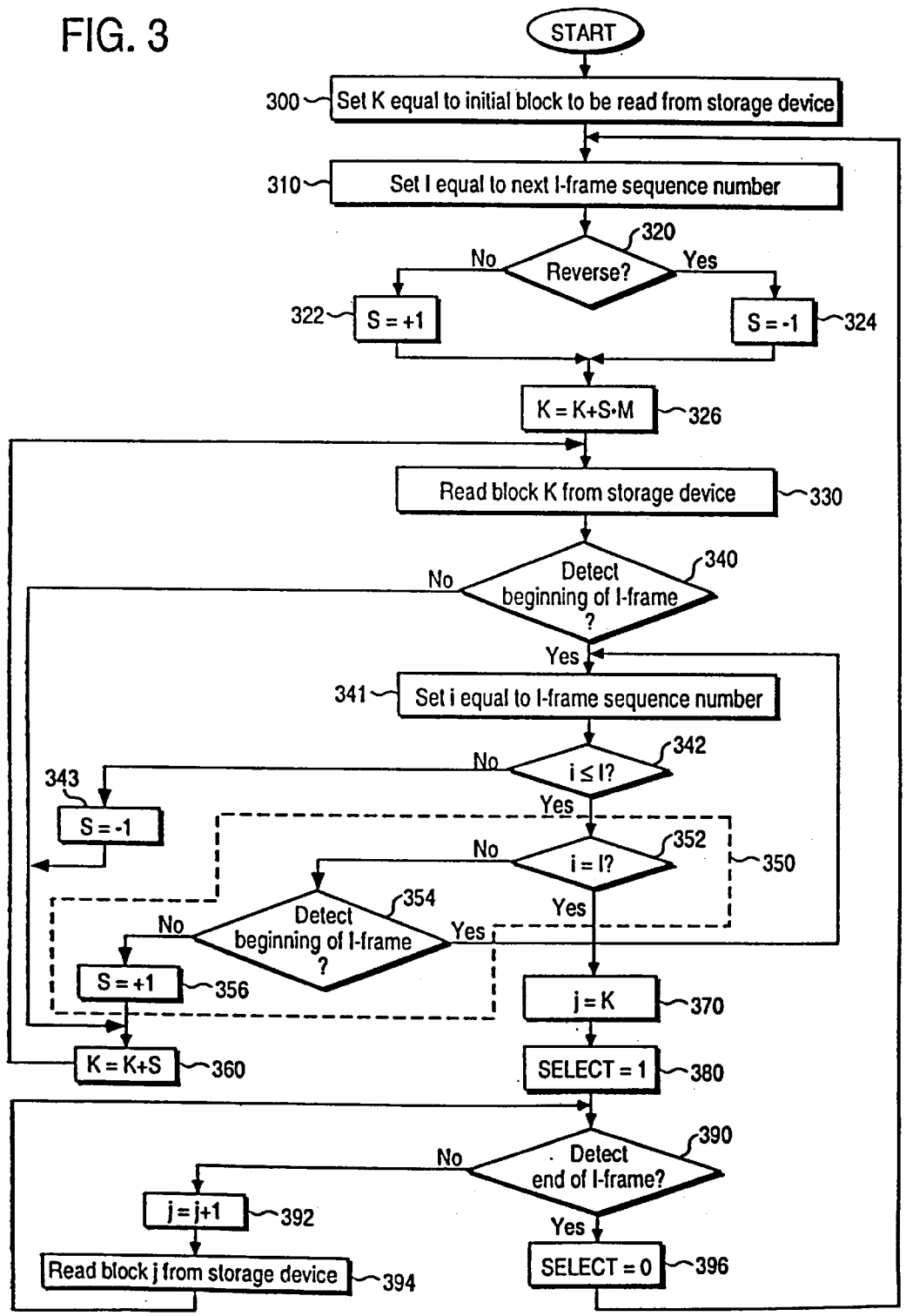
FIG. 3 illustrates a flow diagram for an efficient data retrieval process for use in a compressed video display system operating with various speed modes.
Figure 4:
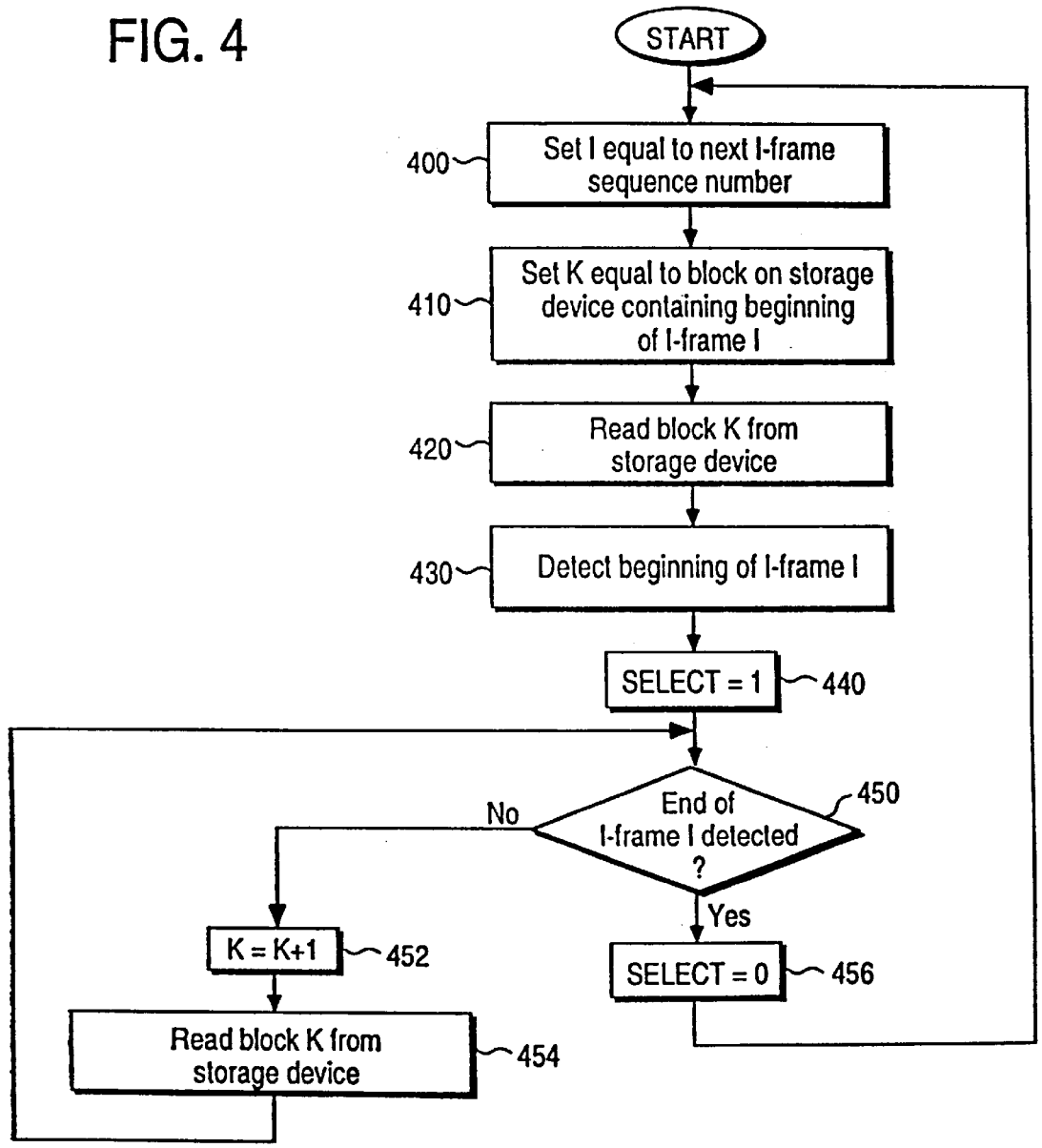
FIG. 4 illustrates a flow diagram for data retrieval for a compressed video display apparatus as an alternative procedure to that illustrated in FIG. 3.

FIG. 3 shows the first embodiment of a process for retrieving I-frames for fast forward or reverse playback. The sequence number of the storage block last read from the Storage Device 140 is used to initialize a storage block counter k in step 300. The sequence number of the next I-frame to be displayed is determined based on the current playback mode and is denoted by 'I' in step 310. In steps 320–326, an initial estimate of k corresponding to the beginning of this next I-frame is also determined, either by adding a constant M to the previous storage block number (k from step 300) if in fast forward mode (steps 320, 322, and 326), or by subtracting the constant M if in reverse mode (steps 320, 324, and 326). The value of M can be specified based on the compression ratio and the playback speed or it may be continuously adjusted based on the observed number of storage blocks separating the most recently-retrieved I-frames.

The storage block identified by the preceding calculation is retrieved from the Storage Device 140 in step 330 and examined for an unique sequence of bits which identify the beginning of all I-frames in step 340. For example, in the MPEG standard, this sequence of bits is specified in international specification ISO/IEC-11172. If an I-frame is not found, then an adjacent storage block will be retrieved by incrementing the storage block counter k in step 360 and reading in a new storage block in step 330. Once an I-frame is detected, in step 340, its sequence number is extracted from the bitstream in step 341 and compared to the desired sequence number I in steps 342 and 352. The I-frame may be earlier than the desired I-frame (condition 'n' in step 352), later than the desired I-frame (condition 'n' in step 342), or equal to the desired I-frame (condition 'y' in step 352).

Depending on the size of each storage block and the current compression ratio, it may be possible for a storage block to contain more than one I-frame. Therefore, if the I-frame is earlier than the desired I-frame (condition 'n' in step 352), the remainder of the storage block will continue to be examined until the next I-frame is found either in the present storage block (condition 'y' in step 354) or in the next storage block (steps 356, 360, 330 and 340).

If the I-frame is later than the desired I-frame (condition 'n' in step 342), the storage block counter is decremented in steps 343 and 360, the previous storage block is read from the storage device in step 330, and the search is repeated from step 340 forward.

If the I-frame is the desired I-frame, no additional searching is required.

Once the beginning of the desired I-frame is found, SELECT is set to 1 in step 380 to indicate that subsequent data are to be provided to the Decoder 150 for display. Data will continue to be provided until the end of the I-frame is detected in step 390, even if this requires the retrieval of additional blocks from the storage device. Steps 392 and 394 show that a second storage counter, j, allows this additional retrieval without resetting the previous storage block counter k.

When the end of the frame is detected, usually by detecting the beginning of the next frame, SELECT is cleared to 0 in step 396 to indicate that the following data are not to be transferred to the decoder. The next I-frame to be retrieved is then determined by adjusting the value of I to the next desired sequence number and the process is repeated from step 310 forward.

At high playback speeds, it may not be necessary to retrieve the exact I-frame whose sequence number equals I. For example, if reverse playback mode has been selected and if every twelfth frame of the compressed bit stream is an I-frame, then one might choose the value of I to coincide with the sequence number of the I-frame that occurs 12 frames earlier than the previously displayed I-frame. Suppose, however, that in the process of searching for this particular I-frame, a different I-frame is detected. If this is the one that occurs 24 frames before the last one that was displayed, then it may be better to accept this one than to continue searching for the one that occurs 12 frames earlier. Not only would this improve efficiency and reduce the performance requirements of the Controller 130 hardware, but it is also unlikely to have a noticeable effect on the aesthetic appearance of the reconstructed sequence. This is because at high playback speeds, the viewer is less sensitive to variations in the rate of playback, particularly when such variations only occur when there is little motion activity. Fortunately, if the value of M is properly chosen, then this should happen only when the compression efficiency is higher than normal, as is often the case when there is little movement between frames.

The relaxation of the constraint on the sequence number of the next I-frame can be easily implemented in the flow chart of FIG. 3. For reverse playback, this can be done simply by eliminating the steps denoted collectively as step 350. In this way, any detected I-frame will be selected as long as its sequence number is less than or equal to I. In the simplest implementation, any I-frame would be selected as long as its sequence number differs from that of the previously selected I-frame.

Non-Sequential Access Using Previously Known Address Information

A more efficient retrieval method can be used if the locations of the I-frames on the Storage Device 140 are known in advance. FIG. 4 shows this second embodiment for retrieving I-frames for fast forward and reverse playback. The sequence number I of the next I-frame to be retrieved is determined as in the first embodiment, based on the direction and rate of playback in step 400. The address or index number of the block on the storage device containing the beginning of this I-frame is then determined by referencing a table which is created in advance (not shown in FIG. 4) and used to initialize storage block counter k in step 410. This storage block is then retrieved, in step 420, and the beginning of the I-frame is located by scanning the storage block for the unique sequence of bits used to identify the I-frames and comparing the sequence number with the chosen value I, in step 430. SELECT is then set to 1, in step 440, so that subsequent data will be delivered to the Decoder 150. As shown in steps 450–456 (like steps 390–396 of FIG. 3) the Controller 130 will then continue to retrieve subsequent blocks from the storage device until the end of the I-frame is detected, at which time SELECT will be reset to 0.

Figure 5:
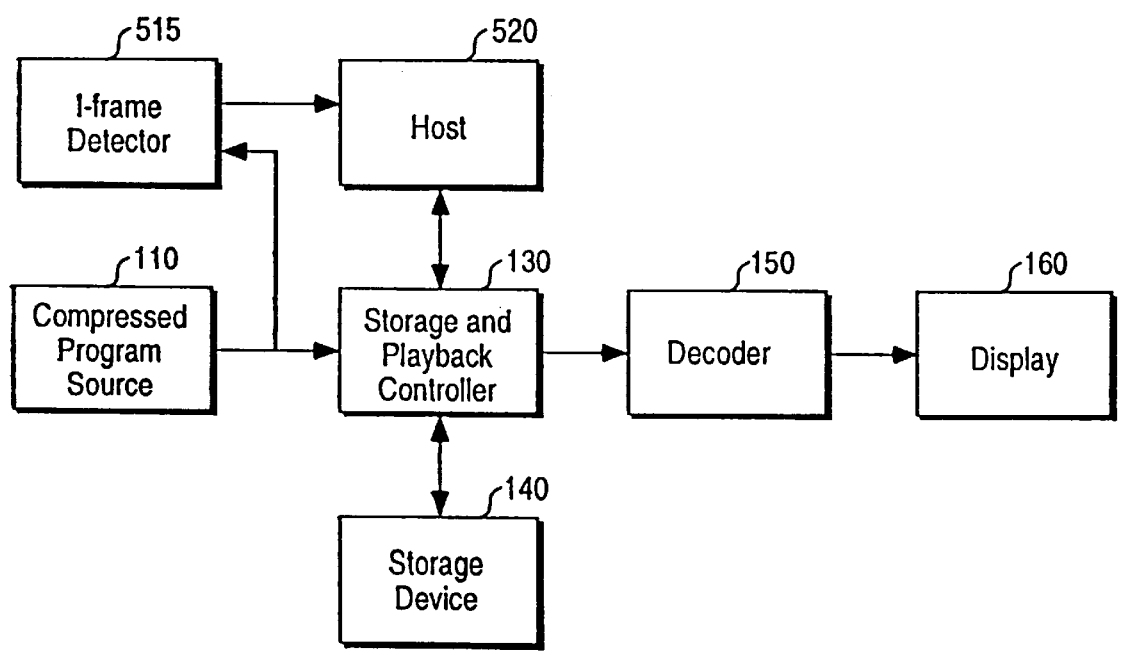
FIG. 5 illustrates a block diagram of a compressed video display system in which tables are maintained to facilitate the efficient retrieval of compressed video data for display at various playback speeds in accordance with the flow diagram at FIG. 4.

The information needed to generate the table mapping I-frames to storage blocks can be acquired at the time that the compressed bit stream is transferred to the Storage Device 140. This can be done using the alternative system block diagram shown in FIG. 5. In this embodiment, the User Interface 120 has been replaced by a more flexible Host Processor 520 which not only performs the functions of the User Interface 120 but also maintains the I-frame block mapping table. As will be appreciated by those skilled in the art, Host 520 can be any computer, microprocessor, microcontroller or other programmable or nonprogrmmable logic capable of handling the necessary memory management functions. An I-frame Detector Circuit 515 monitors the compressed program data as they are transferred from the Compressed Program Source 110 to the Controller 130. The I-frame Detector 515 interrupts the Host 520 each time an I-frame is detected. Host 520 reads the sequence number corresponding to the detected I-frame and matches it with the storage block currently being addressed on Storage Device 140. In most systems, the storage block addressing information would originate on the Host 520, and therefore, would be readily available when generating the table. As will be appreciated by those skilled in the art, the I-frame Detector Circuit need not be present if I-frame occurrence is signaled directly from the Compressed Program Source 100 to the Controller 130.

While the present invention has been disclosed with respect to certain particular embodiments, it is to be understood that the invention is not limited to these embodiments and that various modifications and changes thereto may be effected without departing from the spirit and scope of the invention.

What is claimed is:

1. A system for decoding and displaying compressed video data on a display device comprising:
    a storage device for storing the compressed video data, the compressed video data comprising independent picture data and dependent picture data and the compressed video data not being specially formatted to facilitate a high speed playback mode;
    a decoder coupled to communicate with a storage and playback controller for decoding the compressed video data for display on the display device; and
    the storage and playback controller coupled to communicate with the storage device for controlling the delivery of the compressed video data to the decoder, the storage and playback controller configured for operation during a transition interval between a current playback mode and a desired playback mode, wherein the current playback mode lacks certain picture data needed for operation of the desired playback mode, the storage and playback controller further configured to prevent decoding artifacts by discarding the compressed video data until receipt of a next independent picture data in response to an instruction for transitioning to the desired playback mode from the current playback mode, forwarding the next frame of independent picture data to the decoder, and thereafter selectively forwarding frames of dependent picture data to the decoder.

2. The system of claim 1 wherein the dependent picture data comprises uni-directional dependent picture data and bi-directional dependent picture data, the storage and playback controller configured for discarding bi-directional dependent picture data after receipt of a next independent picture data and until receipt of a next uni-directional dependent picture data.

3. The system of claim 2 wherein the compressed video data are encoded in accordance with the MPEG standard, the independent picture data comprises I-Pictures, the uni-directional picture data comprises P-Pictures and the bi-directional dependent picture data comprises B-Pictures.

4. The system of claim 1 wherein the storage and playback controller is coupled to receive the compressed video data from a compressed program source, the storage and playback controller for controlling the storage of the compressed video data in the storage device.

5. The system of claim 4 further comprising:
    an independent picture data detector coupled to monitor the compressed video data from the compressed program source as the video data are stored in the storage device; and a table maintenance means coupled to communicate with the independent picture data detector and with the storage and playback controller, the table maintenance means for maintaining a table of storage locations in the storage device corresponding to storage locations for the independent picture data detected by the independent picture detector.

6. The system of claim 5 further comprising a host processor for incorporating the table maintenance means and for providing the playback mode transition instruction to the storage and playback controller.

7. The system of claim 4 further comprising a table maintenance means coupled to communicate with the compressed program source and the storage and playback controller, the table maintenance means for maintaining a table of storage locations in the storage device, the storage locations determinable upon receipt of independent picture identification signals from the compressed program source.

8. The system of claim 7 further comprising a host processor for incorporating the table maintenance means and for providing the playback mode transition instruction to the storage and playback controller.

9. The system of claim 1 further comprising means for estimating the storage locations of independent picture data in the storage device for effecting a desired playback mode.

10. The system of claim 9 wherein the means for estimating includes means for estimating storage locations for subsequent independent picture data for effecting a fast forward playback mode.

11. The system of claim 9 wherein the means for estimating includes means for estimating storage locations for previous independent picture data for effecting a reverse playback mode.

12. A system for providing compressed video data in a controlled sequence comprising:

a storage device for storing the compressed video data, the compressed video data comprising at least first and second picture data types, and the compressed video data not being specifically formatted to facilitate a high speed playback mode, wherein the compressed video data is compressed at a non-fixed rate; and a storage and playback controller coupled to communicate with the storage device for controlling delivery of the compressed video data, the storage and playback controller configured for operation during a transition interval between a current playback mode and a desired playback mode wherein the current playback mode lacks certain picture data needed for operation of the desired playback mode and wherein the compressed video data is discarded until receipt of data corresponding to a frame of the first picture data type in response to an instruction for transitioning to the desired playback mode from the current playback mode, the storage and playback controller further configured for accessing the storage device by estimating a storage location in the storage device for a next desired frame of compressed video data of the first picture data type, without referencing a previously known storage address of the next desired frame.

13. The system of claim 12 wherein the storage and playback controller incorporates means for incrementing an index value into the storage device a predetermined amount M in accordance with a compression characteristic of the compressed video data for effecting a fast forward playback mode.

14. The system of claim 12 wherein the storage and playback controller incorporates means for decrementing an index value into the storage device a predetermined amount M in accordance with a compression characteristic of the compressed video data for effecting a reverse playback mode.

15. The system of claim 12 wherein the first picture data type comprises independent picture data and the second picture data type comprises dependent picture data.

16. A system for providing compressed video data in a controlled sequence, the system receiving the compressed video data from a compressed program source, the system comprising:

a storage device for storing the compressed video data when it is received from the compressed program source, the compressed video data comprising at least first and second picture data types, and the compressed video data not being specifically formatted to facilitate a high speed playback mode;

a first picture data type detector coupled to monitor the compressed video data from the compressed program source as the compressed video data are stored in the storage device;

a table maintenance means coupled to communicate with the first picture data type detector for maintaining a table of storage device locations corresponding to storage locations for the independent picture data detected by the detector; and a storage and playback controller coupled to communicate with the storage device for storing the compressed video data therein and for controlling delivery of the compressed video data, the storage and playback controller configured for retrieving data from the storage device by referring to the table for a storage location in the storage device for a next desired frame of compressed video data of the first picture data type.

17. The system of claim 16 wherein the first picture data type comprises independent picture data and the second picture data type comprises dependent picture data.

18. The system of claim 17 wherein the dependent picture data comprises uni-directional dependent picture data and bi-directional dependent picture data, the storage and playback controller configured for discarding bi-directional dependent picture data after receipt of a next independent picture data, and until receipt of a next uni-directional dependent picture data.

19. The system of claim 18 wherein the compressed video data are encoded in accordance with the MPEG standard, the independent picture data comprises I-Pictures, the uni-directional picture data comprises P-Pictures and the bi-directional dependent picture data comprises B-Pictures.

20. The system of claim 16 further comprising a host processor for incorporating the table maintenance means and for providing the playback mode transition instruction to the storage and playback controller.

21. A system for providing compressed video data in a controlled sequence, the system receiving the compressed video data from a compressed program source, the system comprising:

a storage device for storing the compressed video data when it is received from the compressed program source, the compressed video data comprising at least first and second picture data types, and the compressed video data not being specifically formatted to facilitate a high speed playback mode;

a table maintenance means coupled to communicate with the compressed program source and the storage and playback controller, the table maintenance means for maintaining a table of storage locations in the storage device, the storage locations being determined upon receipt of independent picture identification signals from the compressed program source; and a storage and playback controller coupled to communicate with the storage device for storing the compressed video data therein and for controlling delivery of the compressed video data, the storage and playback controller configured for operation during a transition interval between a current playback mode and a desired playback mode wherein the current playback mode lacks certain picture data needed for operation of the desired playback mode and wherein the compressed video data is discarded until receipt of data corresponding to a frame of the first picture data type in response to an instruction for transitioning to the desired playback mode from the current playback mode, the storage and playback controller further configured for retrieving data from the storage device by referring to the table for a storage location in the storage device for a next desired frame of compressed video data of the first picture data type.

22. The system of claim 21 wherein the first picture data type comprises independent picture data and the second picture data type comprises dependent picture data.

23. The system of claim 22 wherein the dependent picture data comprises uni-directional dependent picture data and bi-directional dependent picture data, the storage and playback controller configured for discarding bi-directional dependent picture data after receipt of a next independent picture data, and until receipt of a next uni-directional dependent picture data.

24. The system of claim 23 wherein the compressed video data are encoded in accordance with the MPEG standard, the independent picture data comprises I-Pictures, the uni-directional picture data comprises P-Pictures and the bi-directional dependent picture data comprises B-Pictures.

25. The system of claim 21 further comprising a host processor for incorporating the table maintenance means and for providing the playback mode transition instruction to the storage and playback controller.

26. A storage and playback controller for use in an MPEG display system for controlling the delivery of compressed video data to a decode and display mechanism, the compressed video data not being specially formatted to facilitate a high speed playback mode, the storage and playback controller configured for, in response to a instruction for transitioning to a desired playback mode from a current playback mode, identifying a first storage block and a desired independent picture;

dynamically computing a displacement measure;

determining a second storage block corresponding to the first storage block offset by the displacement measure; and repetitively:

reading the second storage block from the storage device;

determining whether the second storage block comprises the beginning of an independent picture;

delivering the independent picture to the decoder if the independent picture is the desired independent picture or a successor of the desired independent picture in the direction of playback, wherein additional storage blocks are read as necessary to deliver the independent picture;

otherwise assigning the next storage block in the direction of playback to be second storage block.

27. The storage and playback controller of claim 26, configured for accepting at least one P-frame of video data after the receipt of the I-frame of video data.

28. The storage and playback controller of claim 27, configured for accepting at least one B-frame of video data after acceptance of the P-frame of video data.

* * * * *